H. E. COOKE, Jr.
PROCESS OF PRODUCING COCOA POWDER AND COCOA BUTTER.
APPLICATION FILED MAY 26, 1910.
1,006,913.
Patented Oct. 24, 1911.
2 SHEETS—SHEET 1.
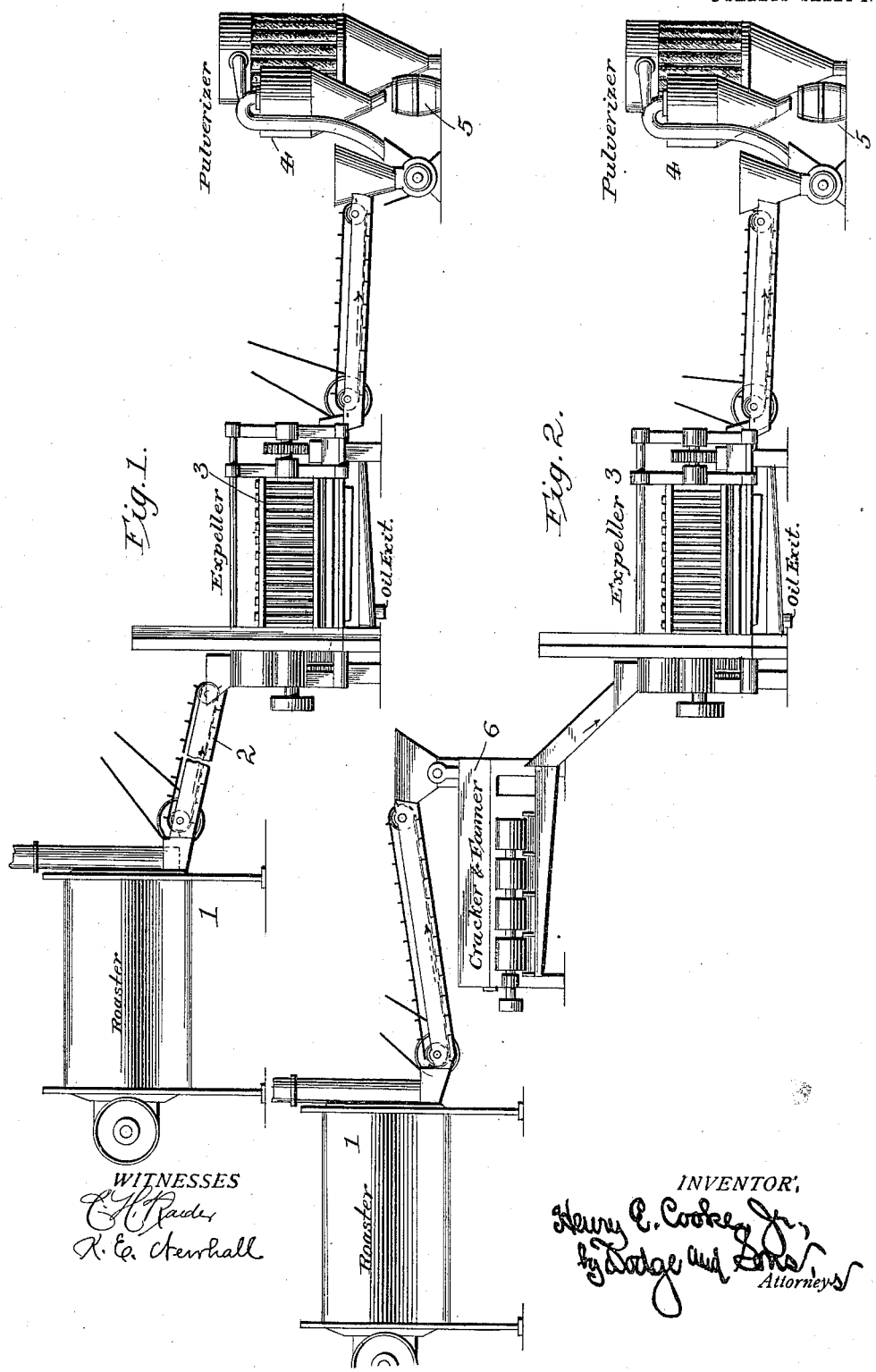

H. E. COOKE, Jr.
PROCESS OF PRODUCING COCOA POWDER AND COCOA BUTTER.
APPLICATION FILED MAY 26, 1910.
1,006,913.
Patented Oct. 24, 1911.
2 SHEETS—SHEET 2.
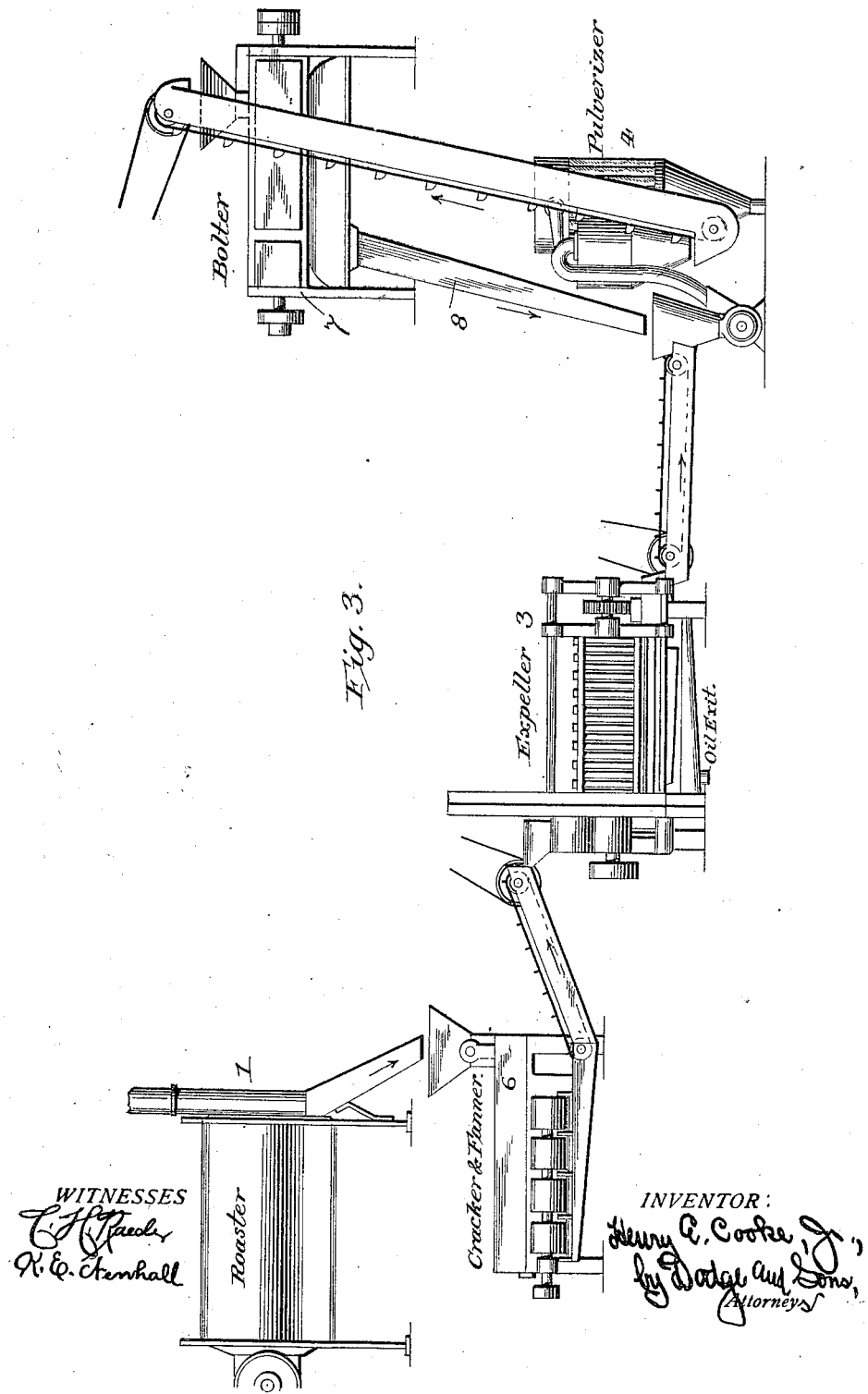

UNITED STATES PATENT OFFICE.

HENRY E. COOKE, JR., OF CHICAGO, ILLINOIS.

PROCESS OF PRODUCING COCOA-POWDER AND COCOA-BUTTER.

1,006,913.  Specification of Letters Patent.  Patented Oct. 24, 1911.

Application filed May 26, 1910. Serial No. 563,559.

*To all whom it may concern:*

Be it known that I, HENRY E. COOKE, Jr., a citizen of the United States, residing at Chicago, in the county of Cook and State of Illinois, have invented certain new and useful Improvements in Processes of Producing Cocoa-Powder and Cocoa-Butter, of which the following is a specification.

My present invention pertains to an improved process of treating cocoa beans for producing cocoa powder and oil (cocoa butter); and has for its objects, first, the simplification and consequently the cheapening of the process as now usually practiced, and, secondly, the production of a powder which contains less oil than that commonly made, the smallest quantity possible being desirable for several uses to which cocoa powder is put, notably in the manufacture of chocolate syrup for soda fountain uses. As a result, a greater quantity of oil is produced from a given quantity of beans than can be obtained by any other methods or machinery now in use. Furthermore, the process is a continuous one.

In the commercial process for the production of powdered cocoa as now commonly practiced, the following steps are employed: The beans are first roasted, then cooled, and when cooled are generally, though not always, cracked and winnowed. The broken beans or cotyledons are then ground into a thick liquid or paste-like mass, which mass is forced through a filter or treated in a hydraulic press, thereby producing oil or cocoa butter and pressed cocoa cakes. The cakes are then broken up, crushed and bolted, the tailings being again crushed and bolted. This process, which is universally practiced, involves the use of various pieces of apparatus, more or less expensive and of necessity occupying considerable floor-space and usually extending through two or more stories of the factory, and, furthermore, involves the expenditure of much power.

Under the present process several of the steps are entirely eliminated (and one or more may be omitted if desired) and a better product obtained. The use of the grinding mills and the presses is entirely done away with and these are two of the most expensive pieces of apparatus, not only as to cost but also in the use of power and attendant labor.

In its simplest embodiment the process consists in roasting the bean, then passing the bean (while still hot or warm) into an "expeller" now commercially known as the "Anderson expeller" (said expeller being shown in Letters Patent of the United States, among others, as follows: Nos. 647,354, dated April 10, 1900; 731,734, dated June 23, 1903; 829,314, dated August 21, 1906; and 829,315, dated August 21, 1906), wherein the bean is thoroughly broken down and the oil almost completely expelled therefrom, the product containing much less oil than the mass or cake left in the usual hydraulic press. The thoroughly dried mass is then passed directly to a pulverizer which handles it so as to produce a commercial product. Here it may be noted that if the mass contained as much oil as is present in the usual filter-press cake, the pulverizer could not directly handle it and it would be necessary to break up the cake, as is now commonly done in a "melanguer" (a machine employing crushing rolls), preparatory to the usual bolting operation which follows.

As a modification of the process, when a slightly different product is desired, the cocoa beans may be cracked and the shells removed therefrom, this by passing the roasted beans through a cracker and fanner, the body or cotyledons of the beans being thence passed to the expeller. Again, if a finer or more finished product be desired, the material may be passed from the pulverizer into a bolter, the tailings therefrom being preferably passed back to the pulverizer to be again treated.

The apparatus by which the process may be carried out as above outlined is illustrated in the three annexed views, Figure 1, Fig. 2 and Fig. 3, wherein the apparatus is illustrated in a more or less diagrammatic manner.

In the apparatus shown in Fig. 1, the whole bean is roasted in a roaster 1, from which it is passed by a conveyer 2 (or in any other suitable manner) into the feed hopper of an Anderson expeller denoted by 3. Said expeller takes the bean, hull and all, thoroughly crushes the same and through its action expels the oil to such an extent that the mass may be passed directly to a pulverizer, denoted in Fig. 1 by 4, the finished product being discharged into a suitable receptacle, as 5. The process as outlined is a continuous one, the mass of cocoa passing directly to the pulverizer which, as before noted, can handle the same owing to the relatively low per cent. of contained or retained oil. It is even conceivable that the roaster may be omitted, the raw beans being fed directly into the expeller; in such case the resultant powder may or may not be roasted or cooked.

In Fig. 2 a cracker and fanner 6 is introduced between the roaster and expeller. This, as will be readily understood, separates the shell from the body of the bean and said body portion is passed to the expeller, as in Fig. 1. The separation of the shells from the body of the bean permits the use of the shells for any purpose which may be desired.

In Fig. 3 a still further modification is shown, wherein the material passing from the pulverizer is fed through a bolter, indicated at 7, the bolter producing a somewhat finer grade of material than can be obtained in the pulverizer. The tailings from the bolter may be passed therefrom through a spout 8 or other conveyer to the hopper of the pulverizer to be again passed through the same and thence to the bolter.

Under all the various modifications as above outlined the yield of cocoa butter from a given quantity of stock is greater than under the old process.

As above indicated, various forms of roasters, crackers and fanners, pulverizers and bolters may be employed. So, too, any form of apparatus may be substituted for the expeller, so long as the same will extract the oil to such an extent that the mass may be directly treated by the pulverizer.

Up to the present time there has not been known to me, nor is there any commercial machine extant, which will take the place of the Anderson expeller in the process as herein outlined.

As above noted, the process does away entirely with the grinding which has heretofore taken place in the production of cocoa, and also the expensive and somewhat slow and troublesome filter or hydraulic press. Again, what perhaps may be considered of prime importance, is the fact that the process is a continuous one and it is not necessary to shut down to substitute new filter-cloths, bags, or the like, and to recharge the hydraulic presses and remove the cake therefrom. Furthermore, the floor-space necessary to the installation of the present apparatus is materially smaller than that required in the old methods. Again, the horse-power required to produce a given quantity of finished product under the present process is from two-thirds to three-fourths less than that necessary under the old method now in use.

In the simplest form of the apparatus, the necessity of cracking, winnowing, grinding and passing the ground material through a filter or hydraulic press and the breaking up, crushing and bolting of the material are done away with and the only steps necessary to be employed are roasting, expelling the oil and pulverizing.

Having thus described my invention, what I claim is:

1. The process of producing cocoa and cocoa-butter from cocoa beans, which comprises the following steps, to wit: roasting the beans; then, without any chemical treatment, expelling the oil therefrom to such an extent that the mass may be pulverized; and finally pulverizing the same.

2. The process of producing cocoa and cocoa-butter from cocoa beans, which comprises the following steps, viz: roasting the beans; then directly, without any chemical treatment, expelling the oil from such roasted beans to such an extent that the mass may be pulverized; and finally and without further treatment pulverizing the mass from which the oil has been expelled.

3. The process of producing cocoa and cocoa butter from cocoa beans, which comprises the following steps, to wit: roasting said beans; cracking the beans and separating the hull or shell therefrom; then, without any chemical treatment, expelling the oil from the mass of beans to such an extent that the mass may be directly pulverized; and finally pulverizing such mass.

4. The process of producing cocoa and cocoa butter from cocoa beans, which comprises the following steps, to wit: roasting the beans; cracking and fanning the shell from the cotyledons; then, without any chemical treatment, expelling the oil from the mass of cotyledons to such an extent that the resultant mass may be directly pulverized; pulverizing such mass; and finally bolting the same.

5. The process of producing cocoa and cocoa butter from cocoa beans, which comprises the following steps, to wit: roasting the beans; removing the oil from the roasted beans solely by mechanical means to such an extent that the mass may be directly pulverized without further treatment; and then pulverizing the same.

6. The process of producing cocoa and cocoa-butter from cocoa beans, which comprises the following steps, to wit: roasting the beans; and then, without any chemical treatment, expelling the oil therefrom to such an extent that the mass may be directly pulverized.

In testimony whereof I have signed my name to this specification in the presence of two subscribing witnesses.

HENRY E. COOKE, Jr.

Witnesses:
ALBERT A. COOP,
TRUMAN F. MILLER.

Copies of this patent may be obtained for five cents each, by addressing the "Commissioner of Patents, Washington, D. C."